United States Patent [19]
Pearson et al.

[11] Patent Number: 4,500,568
[45] Date of Patent: Feb. 19, 1985

[54] PRESERVATION OF STRUCTURES

[75] Inventors: Leonard L. Pearson, Slough; John Litchfield, Croydon, both of England

[73] Assignee: Cole Polymers Limited, Surrey, England

[21] Appl. No.: 328,432

[22] Filed: Dec. 7, 1981

[30] Foreign Application Priority Data

Dec. 6, 1980 [GB] United Kingdom ............... 8039210

[51] Int. Cl.³ .............................................. B05D 3/02
[52] U.S. Cl. .................................... 427/294; 427/295; 427/297; 427/388.2; 427/393; 427/393.6
[58] Field of Search ................. 422/40; 427/294, 297, 427/430.1, 440, 295, 296, 388.2, 393, 393.6

[56] References Cited

U.S. PATENT DOCUMENTS

| 3,407,088 | 10/1968 | Feibush et al. | 427/294 X |
| 3,553,005 | 1/1971 | Moragne | 427/294 |
| 3,579,369 | 5/1971 | Foster | 427/297 X |
| 3,663,261 | 5/1972 | Miettinen | 427/294 X |
| 4,057,657 | 11/1977 | Garnett et al. | 427/44 |
| 4,060,953 | 12/1977 | Milne | 52/743 |
| 4,338,353 | 7/1982 | Melchier | 427/294 X |

FOREIGN PATENT DOCUMENTS

| 2111149 | 9/1971 | Fed. Rep. of Germany . |
| 2707368 | 8/1977 | Fed. Rep. of Germany ...... 427/297 |
| 2639752 | 11/1977 | Fed. Rep. of Germany . |
| 2816576 | 1/1979 | Fed. Rep. of Germany . |
| 442628 | 10/1979 | Sweden . |
| 1582924 | 1/1981 | United Kingdom . |

OTHER PUBLICATIONS

Soviets Inventions Illustrated, Week C24, Jul. 23, 1980, Sections LO2-A93 E14 and SU-A-692817.

Primary Examiner—Michael R. Lusignan
Attorney, Agent, or Firm—Cushman, Darby & Cushman

[57] ABSTRACT

For use in strengthening of natural or artificial structures, e.g. buildings, monuments, ruins, there is drawn under vacuum into the structure a liquid of low viscosity and comprising a monomer or monomers containing some polymer which may be polymerized in situ. The polymer may be obtained by polymerization of part of the monomer or monomers. The liquid resin is cured at ambient temperature. Acrylates and methacrylates are preferred.

14 Claims, No Drawings

PRESERVATION OF STRUCTURES

The invention relates to the treatment of natural or artificial structures in order to preserve them. Such structures may be made of stone, brick, concrete, timber or like building material. The structures may take a variety of shapes such as walls, bridges, tunnels, ducts, foundations, drains, floors, runways, aprons and the invention is applicable to items of archaeological interest such as monuments and ruins.

It is well know that stone and like structures have a tendency to weaken and even crumble, especially under atmospheric attack. It has been proposed to preserve the structure by impregnating it with a water-repellant material such as a silicone liquid or a polyester or epoxy resin dependent on the porosity of the substrate. Such resins in general have poor colour stability on exposure to light. According to one technique a polyethylene sheet or other fluid-tight sheet is applied to the surface to be treated, such as a wall, with the edges of the sheet being sealed to the wall, e.g. by putty or adhesive tape. The sheet has an opening and a vacuum is drawn via the opening to extract moisture and air from the structure. A preservative material is then fed into the structure and drawn into the thickness of the wall by the vacuum. Variations on the theme are know to improve efficiency. When resins are used they may discolour the stonework in time and this mars the appearance; colour stabilisers may be added to counteract the discolouration.

In U.S. Pat. No. 4,060,953, issued in Dec. 6, 1977, Milne assigned to Balfour Beatty and Company Limited, there is described and claimed a method of strengthening artificial and natural structures having voids therein by introducing a hardenable material in a liquid or semi-liquid state into said voids in the structure, at least some of which voids have openings in at least one surface of the structure, which method comprises surrounding at least a part of the structure containing the voids that are to be filled by a closely fitting, flexible, fluid-impermeable shroud and sealing boundary edges of the shroud to the structure to form a sbustantially fluid-tight enclosure; evacuating air and any other fluid from the voids within the fluid-tight enclosure and when the voids have been substantially evacuated allowing the hardenable material in a liquid or semi-liquid state to enter into the evacuated voids until the hardenable material appears at said openings or voids in the surface or surfaces of the structure and allowing the hardenable material to set. It is intended that the entire disclosure of this U.S. patent be incorporated in this specification merely by this reference.

In the U.S. patent the hardenable material is a resin and polyester resin and epoxy resins are stated. Depending on the particular resin used, they tend to be viscous as a result of which it can be difficult to cause them to penetrate into a structure and they also tend to discolour.

It is one object of this invention to provide a method for strengthening a structure which uses a hardenable material which will cure relatively speedily at ambient temperature.

It is another object of this invention to provide a hardenable material in the form of a low viscosity liquid.

It is another object of this invention to provide a hardenable material which is in the form of a monomer which is partially polymerised.

It is another object of this invention to provide a hardenable material in the form of a liquid partially polymerised monomer and a separate hardener therefor.

These and other objects will become apparent from the following description.

According to one aspect of this invention, there is provided a method of strengthening a structure, comprising drawing a vacuum in a portion of the structure and while maintaining the vacuum drawing into the structure a liquid of low viscosity, the liquid comprising a monomer and a polymer thereof and curing the liquid at ambient temperature.

The monomer must be one which can be polymerised into a polymer which will strengthen the structure. Acrylate and methacrylate monomers, especially methyl methacrylate, are suitable for this purpose and have the advantage that the monomer has a low viscosity which facilitates drawing of the liquid into the structure. Preferably and according to the invention, the monomer is partially polymerised since this has the advantage that curing at ambient temperature is facilitated. The extent of polymerisation must be balanced between the need not to adversely affect the viscosity to the point where drawing of the liquid into the structure becomes difficult and the need to be able to cure the system in the absence of applied heat. The degree of polymerisation is preferably between about 8% and about 30% w/w, most preferably about 10% to about 12%, to meet these objectives. Partial polymerisation can be achieved by polymerising the monomer and chain stopping or polymer can be dissolved in monomer.

The monomer may be any of the range of available acrylates and methacrylates, examples being methyl, ethyl, n-butyl, iso-butyl, hexyl, cyclohexyl octyl (including 2 ethyl-hexyl) decyl, lauryl and cyclohexyl esters thereof. Monomers containing functional groups such as hydroxyl, carboxyl, glycidyl and silane groups may also be used, wholly or in part.

The monomer can also include any of the abovementioned co-monomers with the addition of crosslinking monomers such as ethylene glycol dimethacrylate, 1,3-butanediol dimethacrylate, 1,4-butanediol dimethacrylate polyethyleneglycol dimethacrylate, trimethylolpropane trimethacrylate, 1,6-hexanediol diacrylate, trimethylol propane triacylate, allylmethacrylate and divinyl benzene.

The monomer liquid may also include additives. Examples include plasticisers such as di(n-butyl)phthalate, di(iso-butyl)phthalate, di(octyl)phthalate, di(2-ethylhexyl)azelate, N-ethyl toluene sulphonamides, diakyl adipate, butyl benzyl phthalate, isooctyl benzyl phthalate, benzyl phthalate, butyl phthalyl butyl glycollate, tricresyl phosphate. These plasticisers are available commercially e.g. the SANTICIZER range of Monsanto Chemical Company.

A polymerisation inhibitor will also be present. Examples are the hydroquinone and monomethylether of hydroquinone; and 2,4-dimethyl-6-t-butyl phenol and 4-methyl-2,6-di-t-butyl phenol both of which are available as the TOPANOL range of ICI Limited.

In order to achieve a cure at ambient temperature an activator for a redox system will be present. Activators include tertiary amines such as NN'-dimethylaniline, NN'-dimethyl-p-toluidine, N-phenyl diethanolamine, N-tolyl diethanolamine, to be used with peroxy initiators. The viscosity of the liquid will be varied according to the end use and this may be done by adjusting the amount and the molecular weight of the polymer component of the liquid. Dependent on the end use the viscosity may range from about 10 to about 500 cps, preferably from about 10 to about 20 cps.

A polymerization initiator is added to the liquid monomer just before use, and this may be chosen from the range of diacyl peroxides, for example dilauroyl peroxide and di-benzoyl peroxide.

In a preferred embodiment of this system the initiator is a peroxide and this is mixed with a quantity of polymethyl methacrylate powder to give a product containing 10 to 20% of active peroxide. This is referred to as "the hardener".

The liquid can be made either by addition of preferred polymer powder to the monomeric liquid, or by partially polymerising the monomer, with subsequent addition of plasticiser, polymerisation inhibitor and redox activator.

Typically the system will cure at ambient temperature in about an hour dependent on the proportion of the ingredients and the prevailing conditions.

The method of the invention may be practised using known equipment and apparatus, see e.g. that described in U.S. Pat. No. 4,060,953.

The invention includes for use in the method a liquid of low viscosity and comprising a monomer a portion of which is polymerised whereby the monomer may be cured at ambient temperature, optionally with a redox catalyst system therefor.

The invention further includes a structure which has been strengthened by the method of the invention and especially a concrete structure which has rust-prone metal reinforcement and which has been strengthened by the method.

The invention is illustrated by the following Examples.

EXAMPLE 1

The following mix was charged to a suitable vessel equipped with a heating/cooling jacket, stirrer and reflux condenser.

methyl methacrylate monomer: 80 kg.
azoisobutyronitrile: 6 g.
lauryl mercaptan: 120 g.

The mix was heated with slow agitation to 80°–85° C. and held at that temperature for three hours. The polymer content and viscosity were checked. The charge was cooled and sufficient methyl methacrylate monomer added to achieve a viscosity of about 15 cp. for a polymer content of 8–10%. Plasticizers and activator (NN'dimethylpara-toluidine) were added as required to give a solution containing 1% by wt. 0.01% of the mono methyl ether of hydroquinone as inhibitor were added and the composition formed was stored in a cool place away from light.

In use, 6% by wt. of a 'hardener' consisting of dibenzoyl peroxide in polymethylmethacrylate powder at 14% active peroxide was mixed with the solution from Example 1. Hardening occured in 45 to 60 minutes dependent upon ambient temperature. This allowed adequate time for the syrup to be drawn into the interstices of stone or concrete structures by the vacuum process, where it hardened in situ.

EXAMPLE 2

A solution was prepared as in Example 1 and then diluted with a mixture of methyl and n-butyl methacrylate monomers to provide a more flexible product when cured in situ.

EXAMPLE 3

A solution was prepared as in Example 1 but substituting n-butyl methacrylate for methyl methacrylate monomer to provide a very flexible product when cured in situ.

EXAMPLE 4

A solution was prepared as in Example 1 but methacrylic acid was added to the polymerisate, together with further methyl methacrylate to provide a solution containing 1% methacrylic acid.

The adhesion of the cured product to concrete or stone was much improved.

EXAMPLE 5

A solution was prepared as in Example 1 but gamma-methacroyloxypropyl-trimethoxy silane with further methyl methacrylate was added to provide a solution containing 2.5% of the silane. This variation increased the water resistance of the cured product.

EXAMPLE 6

A solution was prepared as in Example 1 and trimethylolpropane trimethacrylate with further methyl methacrylate was added to provide a solution containing 5% of the trimethylolpropane trimethacrylate. This variation confered solvent resistance on the cured product.

EXAMPLE 7

In an evaluation the method was used to treat the wall of an archaeological ruin. First the wall was washed to remove surface dirt, following which a surface of the wall was covered with a polyethylene sheet. The edges of the sheet were secured to the wall in a fluid-tight manner. The sheet had a duct connected to a vacuum pump through which a vacuum was drawn so removing moisture and air from gaps, pores and cracks in the wall. A syrup having a viscosity of 10 cps at 20° C. and comprising methyl methacrylate monomer partially polymerised, polymer content 12% w/w, and containing 1% w/w of an ultraviolet light fast tertiary amine activator was mixed with a paste of benzoyl peroxide in polymer. When a good vacuum had been achieved in the wall, the freshly prepared liquid mix was fed into the duct to replace the moisture/air removed from the structure. Within an hour the acrylic syrup had cured in situ, penetrating the pores and interstices of the wall to some 2.5 cm depth. The colour of the wall remained unchanged so avoiding the undesired colour change often seen with treated historic buildings.

Because the cured system can strengthen a structure, the method can be applied to strengthen any weakened structure which is sufficiently porous for a vacuum to be drawn therein. It is especially applicable to concrete reinforced with metal reinforcement where the metal has rusted and the structure is thereby weakened. The impregnation according to the invention will strengthen the structure and reduce the risk of further rusting of the metal.

Without further elaboration the foregoing will so fully illustrate our invention that others may, by applying current or future knowledge, readily adapt the same for use under various conditions of service.

We claim:

1. A method of in situ strengthening, without discoloring, a pre-existing structure made of stone, brick, concrete, concrete reinforced with metal reinforcement, wood, or the like, and existing in an ambient environment, comprising the steps of: drawing a vacuum in a portion of the structure and while maintaining the vacuum drawing into the structure a liquid of low viscosity, the liquid comprising a monomer and a polymer, the liquid polymerised to a degree of polymerisation between about 8 percent and about 12 percent w/w/; and curing the liquid at ambient temperature.

2. A method of strengthening, without discoloring, a pre-existing structure made of stone, brick, concrete, wood, concrete reinforced with metal reinforcement, or the like, and existing in an ambient environment by: drawing a vacuum in a portion of the structure and while maintaining the vacuum drawing into the structure a liquid of an hardenable material and allowing the material therein to harden, the improvement which comprises: drawing into the structure a liquid having a viscosity in the range from about 10 cps to about 500 cps, and comprising a monomer and a polymer the liquid polymerised to a degree of polymerisation between about 8 percent and about 12 percent w/w; and allowing the liquid to cure at ambient temperature.

3. A method of in situ strengthening, without discoloring, a pre-existing structure made of stone, brick, concrete, concrete reinforced with metal reinforcement, wood, or the like, and existing in an ambient environment, comprising the steps of: drawing a vacuum in a portion of the structure and while maintaining the vacuum drawing into the structure a liquid of low viscosity, the liquid comprising a monomer and a polymer thereof, the liquid polymerised to a degree of polymerisation between about 8 percent and about 12 percent w/w/; and chemically curing the liquid at ambient temperature.

4. A method according to claim 1, in which the viscosity of the low viscosity liquid ranges from about 10 to about 500 cps.

5. A method according to claim 4, in which the viscosity of the low viscosity liquid ranges from about 10 cps to about 20 cps.

6. A method according to claim 1, in which the monomer of the low viscosity liquid is selected from the class consisting of an acrylate, methacrylate, an ester or an acrylate or methacrylate, a monomer containing a functional group, and a co-monomer and a crosslinking monomer therefor.

7. A method according to claim 1, in which the monomer includes one or more additives selected from the class consisting of a plasticiser, polymerisation inhibitor, a polymerisation initiator and an activator for a redox system.

8. A method according to claim 7, in which a plasticiser and polymerisation inhibitor is added to the liquid; and comprising the further steps of forming a separate hardener comprising an initiator and polymer, and adding the hardener to the liquid just before the liquid is drawn into the structure.

9. A method according to claim 1, in which the structure to be strengthened is a concrete reinforced with metal reinforcement, the liquid being effective to coat the metal reinforcement and resist degradation thereof.

10. A method as recited in claim 1 wherein said curing step is accomplished by chemically curing the liquid.

11. The improved method of claim 2, in which the liquid is selected from the class consisting of an acrylate, methacrylate, an ester of acrylate, an ester of methacrylate, a monomer containing a functional group, and a co-monomer and a crosslinking monomer therefor.

12. The method according to claim 1, in which the liquid includes a plasticiser and a polymerisation inhibitor and a separate hardener therefor comprising an initiator and a polymer powder.

13. The improved method according to claim 2, in which the liquid includes a plasticiser and polymerisation inhibitor and a separate hardener therefor comprising an initiator and a polymer powder.

14. A method as recited in claim 2 wherein said step of allowing the liquid to cure at ambient temperature is accomplished by chemically curing the liquid.

* * * * *